United States Patent [19]

Stepper et al.

[11] Patent Number: 5,243,523
[45] Date of Patent: Sep. 7, 1993

[54] METHOD AND DEVICE FOR COMPUTING A STABILIZED VEHICLE SPEED VALUE FROM A PULSE SIGNAL

[75] Inventors: Mark R. Stepper, Columbus, Ind.; Richard Ling, Scottsdale, Ariz.; James H. Green, Manhattan Beach, Calif.

[73] Assignee: Cummins Electronics Company, Inc., Columbus, Ind.

[21] Appl. No.: 677,653

[22] Filed: Mar. 29, 1991

[51] Int. Cl.$^5$ .......................... G06F 7/70; B60K 31/04
[52] U.S. Cl. .................. 364/424.1; 364/426.04; 364/424.05; 364/431.07; 180/179; 180/176
[58] Field of Search ........... 364/424.1, 426.04, 431.07, 364/424.05; 180/176, 179

[56] References Cited

U.S. PATENT DOCUMENTS

| | | | |
|---|---|---|---|
| 4,072,206 | 2/1978 | Larson et al. | 364/426.04 |
| 4,472,777 | 9/1984 | Youngblood | 364/431.07 |
| 4,479,184 | 10/1984 | Nakano | 364/431.07 |
| 4,709,335 | 11/1987 | Okamoto | 364/426.04 |
| 4,860,210 | 8/1989 | McCombie | 364/426.04 |
| 4,890,231 | 12/1989 | Frantz | 364/426.04 |
| 4,896,267 | 1/1990 | Frantz et al. | 180/176 |
| 4,905,153 | 2/1990 | Suzuki et al. | 364/426.04 |
| 4,905,786 | 3/1990 | Miyake et al. | 180/176 |
| 4,991,100 | 2/1991 | Matsui | 364/426.04 |
| 5,003,482 | 3/1991 | Teratani et al. | 364/426.04 |
| 5,047,936 | 9/1991 | Ishii et al. | 364/424.1 |
| 5,051,905 | 9/1991 | Yoshida | 364/424.1 |

OTHER PUBLICATIONS

"Cummins Electronic Controls for Heavy Duty Diesel Engines" (undated), Lannan, Sisson and Wolber.
"Specing for Peak Performance" (undated), Caterpillar Co.

Primary Examiner—Thomas G. Black
Assistant Examiner—J. H. Louis-Jacques
Attorney, Agent, or Firm—Woodard, Emhardt, Naughton, Moriarty & McNett

[57] ABSTRACT

A method is provided for computing a stabilized vehicle speed value from a detected vehicle speed pulse signal and a detected engine speed signal, the vehicle speed value being for use by a vehicle speed control system. The method comprises several continuous cyclic steps commnncing with generating a measured vehicle speed value from the detected vehicle speed pulse signal and generating a measured engine speed value from the detected engine speed signal. A current gear ratio is calculated from the measured vehicle speed value and the measured engine speed value. This current gear ratio is then passed through a single pole digital filter to filter changes in the gear ratio between consecutive cycles as a function of the current gear ratio and the gear ratio computed in the last preceding cycle of the computation. A current usable gear ratio is generated which is changed from the most recently generated usable gear ratio only if changes in the gear ratio exceed predetermined limit values. Otherwise the current usable gear ratio is unchanged from its most recently generated value. A stabilized predicted vehicle speed value is then computed from the measured engine speed and the current usable gear ratio for use by the vehicle speed control system. Slew rate limiting of the predicted vehicle speed is also provided by the method.

25 Claims, 3 Drawing Sheets

METHOD AND DEVICE FOR COMPUTING A STABILIZED VEHICLE SPEED VALUE FROM A PULSE SIGNAL

BACKGROUND OF THE INVENTION

The present invention relates to a method for computing vehicle speed from a signal provided by a vehicle speed sensor. More particularly, the invention presents such a method which provides a stabilized or optimized vehicle speed value for use by vehicle speed control systems.

Many modern vehicles include a variety of electronic controls, particularly an electronic engine control system for the internal combustion engine. Most such electronic engine control systems provide cruise control or vehicle speed governing capabilities. Such systems and algorithms for cruise control or closed loop vehicle speed are well known in the art.

All such systems require as input some value indicative of the actual vehicle road speed which is derived from a speed sensor. Many types of sensors are available for generating a signal indicative of the vehicle speed, most of which are of the pulse generator type. One such pulse generator is a variable reluctance device in which a magnetic pickup located adjacent a rotating component of the drive train produces a pulse with every rotation of the drive train component. In another similar sensor, known as the MINIGEN TM sold by Synchrastart Co., a mechanical cable is driven by the drive train and the cable rotation is sensed. The timing of the sensor pulses is typically determined by counting the time for a given number of pulses to pass. This timing value is then used to calculate the actual vehicle speed by application of a number of conversion factors.

One difficulty with speed sensors of this type is that the pulse signals have a wide output tolerance and are often subject to errors and inaccuracies. Such errors include a wide variation in time between pulses which can lead to erroneous vehicle speed calculations. Most cruise control systems require a relatively higher accuracy vehicle speed value. Inaccurate or widely varying vehicle speed values can cause a cruise control to oscillate about the vehicle speed set point as it governs the vehicle speed. Some sensors are available that can generate a clean narrow tolerance pulse train, but these sensors are more expensive than the less accurate V/R type sensors. Moreover, many of the more sophisticated sensors are not readily adapted to the harsh environment of the vehicle drive train as the V/R speed pickup sensors. Vibration, dirt and electrical or magnetic interference can render the more sophisticated sensor impractical for use in an automotive setting.

There is a need for a method for processing the pulse train from a relatively low accuracy vehicle speed sensor and generating a higher quality accurate vehicle speed value for use by the cruise control or vehicle speed governing routines of an electronic engine control.

SUMMARY OF THE INVENTION

In view of this need, a primary object of this invention is to provide a method for performing vehicle speed calculations using a low quality, wide tolerance vehicle speed signal. The method contemplates using the more accurate engine crankshaft speed measurement provided by the electronic engine control system to compute a gear ratio, which is simply the ratio of engine speed to the vehicle road speed in normalized units. In a first subroutine, this calculated gear ratio is passed through a single pole digital filter to produce a filtered gear ratio.

A number of tests are applied to determine if this filtered gear ratio has stabilized about a certain value. If not, a usable filtered gear ratio is continuously modified over a settling time. The usable filtered gear ratio is passed to a subsequent second subroutine which computes a predicted vehicle road speed. This predicted vehicle road speed is in a proper form to be supplied to the cruise control or closed loop speed control system of the electronic engine control.

In an important aspect of the method of the invention, once a stabilized usable filtered gear ratio has been obtained in the first subroutine, this stabilized value remains unchanged in spite of minor deviations in the sensed vehicle speed signal. A new usable filtered gear ratio is passed on to the second subroutine only when the sensed vehicle speed signal falls outside predetermined tolerance limits. Such a deviation can be attributable to a change in driving gear (such as through shifting gears) or to gear lash or other variations in the transmission and drive train.

In another aspect of the invention, the second subroutine includes a slew rate limit feature to further "smooth" the vehicle speed value sent to the engine control system. Changes in predicted vehicle speed that exceed a maximum slew rate are modified to produce smoother predicted vehicle speed transitions between successive vehicle speed calculations.

One significant feature of the invention is that the method utilizes the more accurate engine speed information to predict the vehicle road speed. The method produces a gear ratio value by which the engine speed may be multiplied to obtain the vehicle speed. Steps of the method generate an optimized or stabilized gear ratio value for this calculation.

It is one object of the present invention to provide a method for determining a vehicle speed value usable by electronic engine control systems for cruise control or closed loop vehicle speed control. A more specific object is to provide such a speed value that is less susceptible to the frailties and wide tolerances of some vehicle speed sensors.

A further object of the method of the invention is to provide a vehicle speed value that remains at a stabilized value in spite of minor fluctuations in the sensed vehicle speed signal, but that can be modified when a change in vehicle driving gear or an actual vehicle speed change occurs. Other objects, and certain benefits, of the present invention can be discerned from the following description of the preferred embodiment of the invention.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
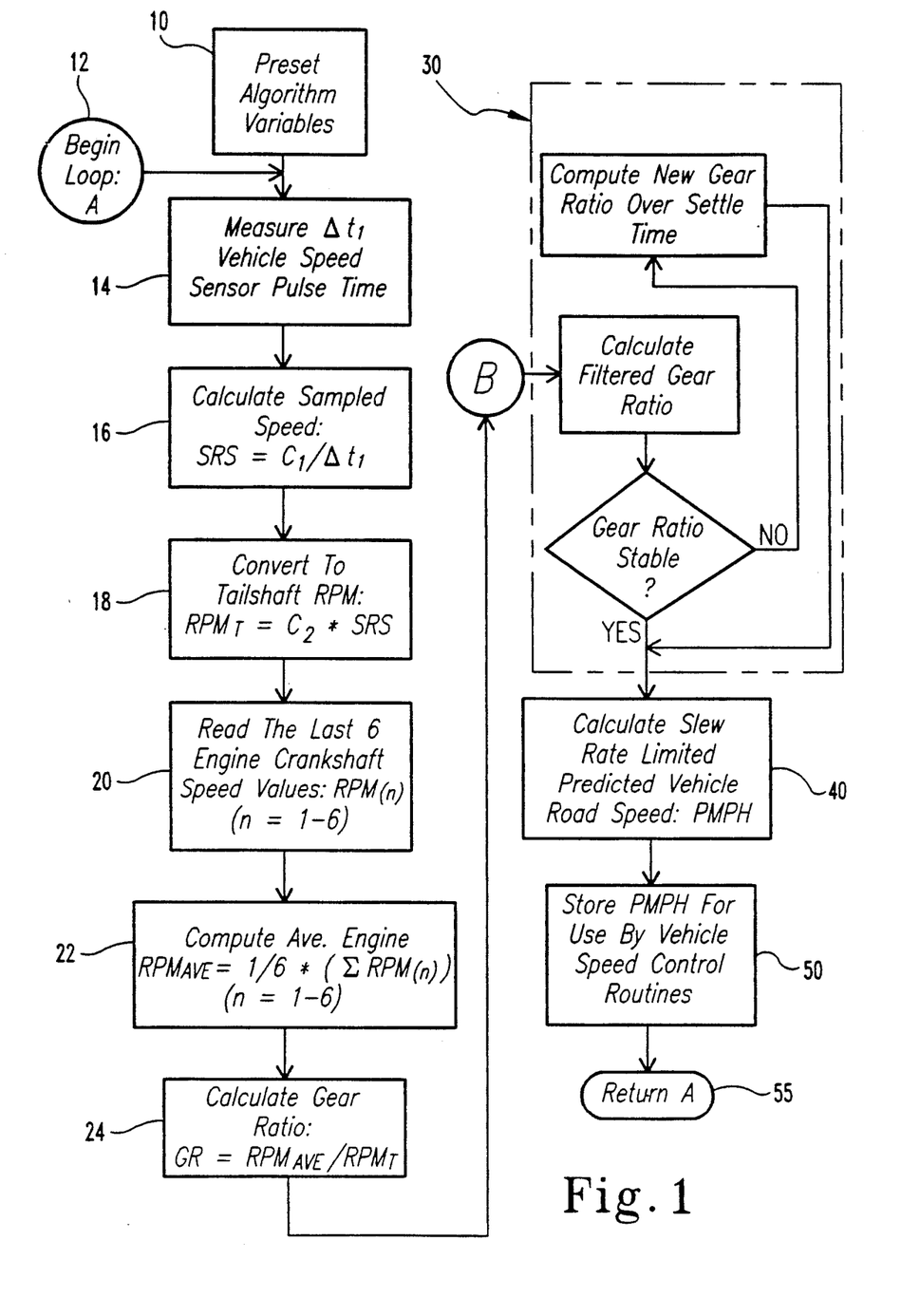
FIG. 1 is a flowchart showing the steps of the method for computing a stabilized vehicle speed value from a pulse signal.

FIG. 1 shows a flowchart of one embodiment of the method and algorithm for computing a stabilized vehicle speed value according to the present invention. In this algorithm, the vehicle speed is calculated in a continuously executed Loop A beginning at entry point A, Step 12 in the flowchart. Each of the subsequent steps is executed sequentially from Step 12 and to the return Step 55. The entire loop and all the calculations performed in the loop are executed over a predetermined time period. In one specific embodiment, the loop time is 0.1 seconds, which permits adequate sampling of the vehicle and engine speeds while allowing time for all the computations to be performed.

At initial startup of the algorithm, that is prior to the beginning of the Loop A, certain variables used by the algorithm are initialized or preset in Step 10. The manner in which the variables are preset depends upon the variable. Since many of the calculations performed in the loop are recursive in nature, most of the algorithm variables are preset to a non-zero value in the range of an expected value for that variable.

With the commencement of the algorithm loop at Step 12, the vehicle speed sensor pulses are read in Step 14 and used to obtain a time interval value $\Delta t_1$, which is indicative of the vehicle road speed. In the preferred embodiment, this $\Delta t_1$ corresponds to the amount of time required for sixteen vehicle speed sensor pulses to pass. Most V/R type sensors generate a signal having 15,000 to 48,000 pulses per mile driven by the vehicle. Vehicle rear end ratio, tire size and pulses per tailshaft revolution determine the pulses per mile value. Although the time interval for the passage of sixteen pulses is measured in the preferred embodiment, fewer or greater numbers of pulses may be sensed to derive a $\Delta t_1$ value. In the next Step 16, a sampled road speed SRS is calculated using the measured $\Delta t_1$, by dividing this time value into a conversion constant $C_1$. This conversion constant $C_1$ has the units mph*seconds to convert the sampled signal time to miles per hour.

In Step 18, a second conversion factor $C_2$ is applied to the calculated sample speed SRS to convert this mph road speed to a tailshaft rpm value, $RPM_t$. It is understood that the tailshaft is the rotating shaft output from the vehicle transmission after the engine rotational speed has been geared up or down. This value $RPM_t$ for the tailshaft rpm is based upon the loosely toleranced signal from the vehicle speed sensor, so that the value itself may vary widely between consecutive passes through the Loop A.

In the next two steps of the algorithm, Steps 20 and 22, the engine speed is determined. The nature of the Steps 20 and 22 will depend upon the engine speed data available from the electronic engine control system. In one specific embodiment, actual engine crankshaft speed values can be obtained from memory locations within the electronic control system. Thus, in Step 20, the last six stored engine crankshaft speed values are read. For clarity, the engine speed values are designated RPM(n), where n=1 to 6. In another specific embodiment, a delta time measurement is made from top dead center (TDC) of one cylinder to TDC of the next cylinder as determined from the rotating camshaft gear. It is understood that the top dead center positions on the camshaft gear for a six-cylinder diesel engine occur every sixty degrees of camshaft rotation. Thus, determining the delta time value from top dead center to top dead center produces six engine crankshaft speed values in one rotation of the camshaft.

These six speed values are then entered into the variable RPM(n). An average engine rpm over the most recent full camshaft rotation is calculated using these six rpm values, as indicated in Step 22. A straight arithmetic average is determined by summing each of the RPM(n) values and dividing by six. This averaging calculation eliminates the manufacturing errors associated with locating the top dead center targets on the camshaft gear. A new variable $RPM_{ave}$ obtained in Step 22 is the computed average engine crankshaft rpm over the last camshaft rotation. This value is based upon the relatively more sensitive and accurate sensors used by the electronic engine control system to determine engine speed.

The tailshaft rpm value $RPM_t$ and the engine rpm value $RPM_{ave}$ are then passed to Step 24 in which a gear ratio is calculated. The gear ratio is the ratio of the average engine rpm to the tailshaft rpm, as shown in the equation in Step 24. This gear ratio variable GR is simply a measure of the step up or down in speed provided by the vehicle transmission and associated gearing. This calculated gear ratio value GR is based in part upon the low integrity vehicle speed sensor signal. Consequently, the variable GR is passed through a Subroutine 30 which filters the gear ratio and generates an optimized gear ratio value to be passed down the loop. A principal object of the Subroutine 30 is to generate a filtered gear ratio value that does not vary unnecessarily with each pass through the Loop A. Thus, the subroutine, produces a usable filtered gear ratio that does not change with every minor variation in sensed vehicle speed. In addition, the Subroutine 30 provides means for computing a new usable filtered gear ratio when a change in vehicle gearing or an actual change in vehicle speed occurs.

This usable gear ratio, designated as variable UGR, is passed to a subsequent Subroutine 40 which determines a slew rate limited predicted vehicle road speed. The function of this Subroutine 40 is to limit the rate of change of the predicted vehicle road speed provided to the engine control system. In one specific embodiment, the Subroutine 40 limits changes in predicted vehicle speed to a slew rate of 2.0 mph per second. In other words, the predicted vehicle road speed is not permitted to change faster than two mph per second on each pass through algorithm Loop A. The slew rate limited predicted vehicle road speed generated by Subroutine 40 is designated as variable PMPH. This variable PMPH is stored in Step 50 within an internal memory of the engine control system for use by the vehicle speed control routines. After the storage Step 50, the control is passed in the return Step 55 to the beginning of the Loop A at Step 12. The calculations in Loop A are constantly repeated and the SLEW RATE LIMITED predicted vehicle road speed PMPH is constantly updated as required by the circumstances.

Figure 2:
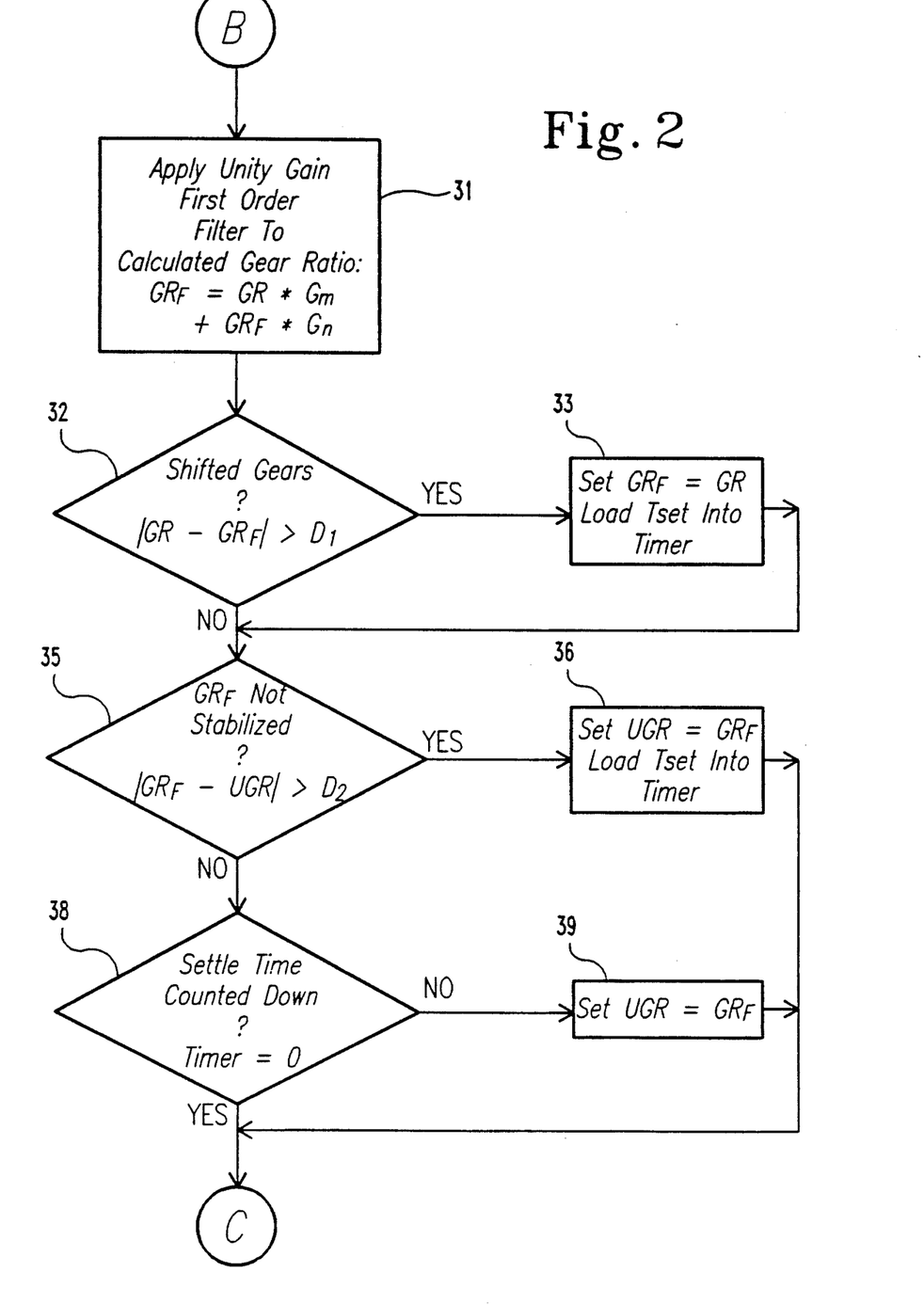
FIG. 2 is a flowchart of the detailed steps of a first subroutine from the flowchart of FIG. 1.

The details of the Subroutine 30 are shown in the flowchart of FIG. 2. In the first step of this subroutine, Step 31, the gear ratio GR is passed through a single pole digital filter to generate a filtered value $GR_F$. The single pole digital filter is a unity gain first order filter implemented by the following equation $GR_F = GR*G_m + GR_F*G_n$ where $G_m$ and $G_n$ are gain values for a known single pole filter. In the preferred embodiment, the single pole digital filter has a time constant $\tau$ of approximately seven seconds. The time constant $\tau$ is adapted to achieve a filtered gear ratio that settles to a state in which the value does not vary outside predetermined limits so long as the vehicle transmission remains in the same driving gear. According to standard digital filtering techniques, $G_n$ is equal to $e^{-T/\tau}$, and $G_m$ is $1.0 - G_n$. Thus, for the specific illustrated embodiment the filtered gear ratio equation reduces to $GR_F = 0.02*GR + 0.98*GR_F$. It should be clear that this single pole filter gives predominant consideration to the last calculated gear ratio $GR_F$. The filter thus automatically minimizes changes in the unfiltered GR between loop passes.

Since Step 31 represents a recursive equation in which the current filtered gear ratio $GR_F$ is a function of the last calculated value for the filtered gear ratio, a preset value for $GR_F$ is provided in Step 10 prior to entering the algorithm Loop A. Regardless of the preset value for $GR_F$, the Subroutine 30 will rapidly bring the newly calculated gear ratio $GR_F$ to a value appropriate for the current vehicle speed and engine rpm.

It should be apparent from the digital filter equation in Step 31 that changes in the filtered gear ratio $GR_F$ will occur more slowly than changes in the gear ratio GR calculated in prior Step 24, specifically since the gain factor $G_m$ applied to the gear ratio GR is considerably less than the gain factor $G_n$ applied to the previous filtered gear ratio value.

After the filtered gear ratio $GR_F$ is determined, a test is made in Step 32 to ascertain whether a vehicle driving gear change has occurred. As is well known, when the vehicle transmission gear changes the ratio between the engine speed and the vehicle speed also changes. According to the present invention, the test compares the unfiltered gear ratio GR with the filtered gear ratio $GR_F$. If the absolute value of the difference between these two variables is greater than a predetermined limit parameter $D_1$, then it is determined that a gear shift has occurred. The limit parameter $D_1$ is set to a value greater than the smallest step in gear ratios between one driving gear to the next. In the specific embodiment, the limit value $D_1$ is set so that a difference of 10% between the unfiltered and filtered gear ratios will cause recognition of a gear shift. The limit parameter $D_1$ can be unitless based simply upon the arithmetic difference between the filtered gear ratio $GR_F$ and the unfiltered gear ratio GR. Alternatively, the limit parameter $D_1$ can be a percentage value, such as 10%, in which case the test equation would be modified to $100*(GR-GR_F)/GR_F$.

If the test in Step 32 is passed, that is if a gear shift is recognized, control in the algorithm passes to Step 33. In this step, the filtered gear ratio $GR_F$ is set equal to the unfiltered value GR since the calculated GR more accurately reflects the true gear ratio after the shift. This revised filtered gear ratio value of $GR_F$ is applied on the right hand side of the filter equation in Step 31 in the next following loop through the algorithm. In addition, in Step 33, a background timer is loaded with a time value $T_{set}$, which corresponds to a settling time increment. This programmable settling time $T_{set}$ fixes an amount of time over which the filtered gear ratio $GR_F$ must remain relatively constant in order to be regarded as stabilized. In the preferred embodiment, this settling time $T_{set}$ is equal to six times the time constant of the digital filter. In the specific embodiment in which the time constant is seven seconds, the value $T_{set}$ is equal to forty-two seconds. That is, the filtered gear ratio $GR_F$ is given forty-two seconds to settle on a relatively stable value before that filtered gear ratio is regarded as stabilized and therefore not changed in subsequent steps of the algorithm.

The timer referred to in Step 33 can be a background count-down timer which can be loaded with new values. Alternatively, the timer can be a software timer within the algorithm Loop A in which the timer is decremented with each pass through the loop. Implementation of the timer can be left to a person of ordinary skill, provided that the timer can be loaded with the settling time value $T_{set}$ as required by the Subroutine 30.

If no gear shift is detected by the test of Step 32, control passes to another test in Step 35. The limit parameter $D_1$ is set so that the expected variations in gear ratio due to normal drive train variations or loosely tolerances vehicle speed sensing will not trigger the Step 32 test. In addition, after Step 33 has been executed when a gear shift is recognized, control also returns to the same Step 35 following setting the new $GR_F$ value and loading the settling time $T_{set}$ into the background timer. In Step 35, the filtered gear ratio is tested to determine whether it has stabilized about a relatively constant value. In the preferred embodiment, the filtered gear ratio $GR_F$ is determined to be stabilized if its current calculated value is within about one percent (1%) of the filtered gear ratio calculated in the last pass through the algorithm Loop A. Thus, the test in Step 35 is whether the absolute value of the difference between $GR_F$ and a new variable UGR is greater than a limit parameter $D_2$. The limit parameter $D_2$ represents a tolerance band within which the gear ratio will be regarded as relatively constant or fixed, even though the measured vehicle speed may vary slightly.

The limit parameter $D_2$ can be unitless for direct comparison between the non-dimensional gear ratio values and can have a value of 0.0118 in one specific embodiment. Alternatively, the limit parameter $D_2$ can be a percentage, in which case the inequality expressed in Step 35 must be divided by the filtered gear ratio $GR_F$ and multiplied times one hundred. The specific values for $D_2$ and the digital filter time constant translate to a tolerance band of about 2.5 mph for variations in the measured vehicle speed value SRS.

The value UGR corresponds to a usable gear ratio, by which is meant a gear ratio value that is ready for use in calculating a vehicle speed to be passed on to the engine control system. As with $GR_F$, UGR must be preset in Step 10 at least for the initial start up of the algorithm Loop A. However, the value UGR will be reset within Subroutine 30 depending upon whether $GR_F$ has stabilized. If the filtered gear ratio has not stabilized about a value, the test in Step 35 is passed and control in the algorithm flows to Step 36. In this step the usable gear ratio UGR is set equal to the current filtered gear ratio $GR_F$. It should be noted that this value $GR_F$ may have been recomputed in Step 33 if a gear shift has occurred. It is clear that a change in vehicle driving gear will also result in a rapid change in gear ratio, thus in a gear shift situation, the inequality test of Step 35 will also be satisfied.

Returning to Step 36, if the filtered gear ratio has not yet stabilized, the background timer is again loaded with the settling time $T_{set}$. This step may be redundant in the event of a gear shift, since the background timer is also loaded in Step 33. However, the timer load is required in Step 36 when Step 33 is avoided because a gear shift has not occurred, since the filtered gear ratio may not be stabilized. The settling time is necessary to validate that the filtered gear ratio $GR_F$ has moved to a relatively fixed value.

If the filtered gear ratio is stabilized, that is if the difference between the last calculated filtered gear ratio and the current calculated filtered gear ratio is less than the limit parameter $D_2$, the test in Step 35 fails and control passes to another test in Step 38. In this step, the background timer is interrogated to determine whether the settling time $T_{set}$ has expired. In other words, for a count-down background timer, the test in Step 38 is whether the timer value is equal to zero. If not, then it is determined that the filtered gear ratio has not yet demonstrated that it is stabilized by remaining relatively unchanged for the entire settling time. In other words, the stabilization test of Step 35 requires the difference between current and last filtered gear ratios to remain within the limit parameter $D_2$ a sufficient number of times though the Loop A for the settling timer to expire.

The philosophy behind Subroutine 30 is that the gear ratio is still varying too much to be locked in at one fixed value. Thus, in Step 39, the usable gear ratio UGR is set equal to the newly calculated filtered gear ratio $GR_F$ and control passes outside the Subroutine 30. If the settling time has expired, the test of Step 38 is passed, which means that the usable gear ratio UGR is not reset, but left at the value that it was on the prior pass through the algorithm Loop A. The value for the usable gear ratio UGR then passes from the Subroutine 30 into the Subroutine 40.

A principal function of the Subroutine 30 is to only change the usable gear ratio UGR when required. Changes in UGR are required when a gear shift has occurred or when the sensed vehicle speed, or more specifically the calculated gear ratio GR, varies or changes too much to be assessed as stabilized about a fixed value. In this instance, the usable gear ratio will change with each pass through the algorithm Loop A. However, if the gear ratio is determined to be stabilized by the various tests in Steps 32, 35 and 38, no change in the usable gear ratio UGR is required. This means that even though the calculated gear ratio GR and the calculated filtered gear ratio $GR_F$ may change, no similar change will be made to the gear ratio value UGR used by the later Subroutine 40. Minor variations in the gear ratio between successive passes through the Loop A less than the limit parameter $D_2$ will not require changes in the usable gear ratio UGR. This limit value $D_2$ can be changed depending upon the degree of accuracy required in the usable gear ratio UGR. In addition, the limit parameter $D_2$ can be changed if the sensed vehicle speed signal is itself more accurate for a "fine tuned" vehicle speed control.

Figure 3:
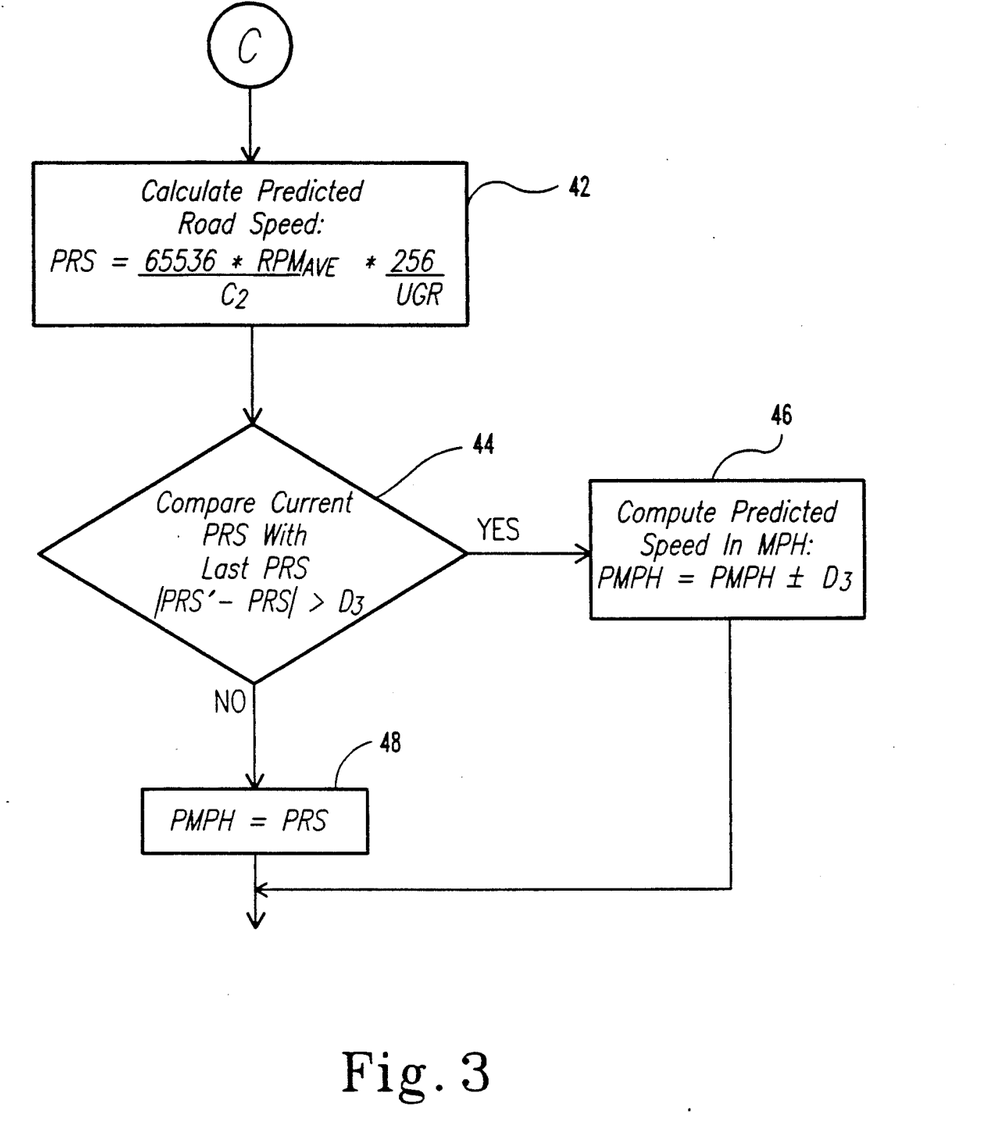
FIG. 3 is a flowchart of the detailed steps of a second subroutine from the flowchart of FIG. 1.

In FIG. 3, the various steps of the Subroutine 40 are depicted. In this Subroutine 40, the vehicle road speed is predicted and limited by a programmable slew rate. In the first Step 42 of the Subroutine 40, a predicted road speed PRS is calculated according to the equation shown. This predicted road speed is a function of the average engine crankshaft rotational speed $RPM_{ave}$ and the usable gear ratio UGR. Various multipliers are applied to these two variables, including the conversion factor constant $C_2$, which was used in Step 18 to convert sampled vehicle speed to tailshaft rpm. The units of this conversion factor constant $C_2$ are rpm over miles per hour. The usable gear ratio UGR is unitless, so that the units of the predicted road speed value PRS are in miles per hour.

In order to prevent rapid swings in predicted road speed between successive passes through the algorithm Loop A, the road speed passed on to the engine control system routines is limited by a programmable slew rate, $D_3$. In Step 44, the current calculated predicted road speed PRS is compared with the road speed calculated in the last pass through the loop, designated as PRS′ in FIG. 3. If the difference between these two values is greater than the limit parameter $D_3$, slew rate limiting is required. In the preferred embodiment the limit parameter $D_3$ is based upon a slew rate limit of 2 mph/second. That is, the vehicle speed value sent to the engine control system is only permitted to vary over time at a rate less than two mph per second. The limit parameter $D_3$ is based upon this 2 mph/second slew rate and upon the time over which all of the calculations occur in the algorithm Loop A. As previously indicated, all the calculations are made every 0.1 seconds, so that $D_3$ is simply 0.1 seconds times 2 mph/second, or 0.2 mph.

If the difference between the current predicted road speed PRS and the last predicted road speed PRS′ is greater than 0.2 miles per hour, slew rate limiting is required. In this instance, algorithm flow passes to Step 46. In this step, a new predicted miles per hour PMPH is computed. This value for PMPH is based upon the last PMPH that was sent to the engine control system, increased or decreased by the slew rate limit parameter $D_3$. Whether the predicted miles per hour PMPH is reduced or increased depends upon the sign of the difference between the last predicted road speed PRS′ and the current predicted road speed PRS. In other words, if the current predicted road speed is greater than the last predicted road speed PRS′, the output speed in PMPH is increased from its last computed value by the value of $D_3$.

If the test of Step 34 fails, that is if no slew limiting is required, the output variable PMPH is simply set equal to the predicted road speed PRS. Additional tests may be added to determine whether slew rate limiting should be overridden in order to track rapid changes in vehicle speed. Following the completion of either Step 46 or 48, the program flow passes to Step 50 in which the value for PMPH is stored in a memory within the engine control system for use by the vehicle speed control or cruise control routines.

The method and algorithm of the present invention can be implemented within the electronic engine control system. The continuous algorithm Loop A can be readily translated to program code for the microprocessor of the electronic engine control system, which translation is application specific but within the ordinary skill of persons in the relevant field. The microprocessor code can permit user entry of the various limit parameters and conversion constants. The algorithm accepts as inputs the pulse signals from the vehicle speed sensor and the engine rpm values, and produces as an output a predicted vehicle road speed PMPH.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for computing a stabilized vehicle speed value from a detected vehicle speed signal and a detected engine speed signal, the vehicle speed value being for use by a vehicle speed control system, the method comprising the continuous cyclic steps of:
   generating a measured vehicle speed value from the detected vehicle speed signal;
   generating a measured engine speed value from the detected engine speed signal;
   computing a calculated gear ratio as a function of the measured vehicle speed value and the measured engine speed value;
   providing a usable gear ratio which is changed as a function of the calculated gear ratio from a previously generated usable gear ratio if changes in the most recently calculated gear ratio from a previously calculated gear ratio exceed a predetermined limit value, and which is otherwise unchanged from the previously generated usable gear ratio; and
   calculating a vehicle speed value from the measured engine speed and the usable gear ratio provided in the previous step of providing a usable gear ratio, and providing the vehicle speed value for use by the vehicle speed control system.

2. The method for computing a stabilized vehicle speed valve of claim 1, wherein the measured engine speed valve is a rolling average valve of the engine speeds calculated between a most recent number of consecutive top dead center positions on the engine camshaft.

3. The method for computing a stabilized vehicle speed value of claim 1, wherein the step of providing a usable gear ratio includes:
   detecting whether a gear shift has occurred; and then
   substituting the calculated gear ratio for the usable gear ratio if a shift is detected, otherwise not changing the usable gear ratio from the previously generated usable gear ratio.

4. The method for computing a stabilized vehicle speed value of claim 3, wherein the step of detecting whether a gear shift has occurred includes:
   computing a current gear ratio from the measured vehicle speed value and the measured engine speed value;
   deriving a filtered gear ratio by filtering the current gear ratio as a function of the current gear ratio and a previously derived filtered gear ratio to filter changes in the current gear ratio between computational cycles;
   computing a shift test value which is equal to the difference between the current gear ratio and the filtered gear ratio; and
   comparing the shift test value to a predetermined first limit value, such first limit value being based upon a smallest expected step in gear ratios between one driving gear to the next.

5. The method for computing a stabilized vehicle speed value of claim 1, wherein the step of calculating a vehicle speed value includes:
   limiting the rate of change of the vehicle speed value between successive computational cycles to a predetermined slew rate limit.

6. The method for computing a stabilized vehicle speed value of claim 5, wherein the step of limiting the rate of change of the vehicle speed value includes:
   comparing the magnitude of the difference between the vehicle speed value and the vehicle speed value calculated in a previous computational cycle to the predetermined slew rate limit; and
   if such magnitude exceeds the predetermined slew rate limit, changing the vehicle speed value to the previously calculated vehicle speed value increased or decreased by the predetermined slew rate limit depending upon the positive or negative sense of such difference.

7. The method for computing a stabilized vehicle speed value of claim 1, wherein the step of computing a calculated gear ratio includes:
   computing a current gear ratio from the measured vehicle speed value and the measured engine speed value;
   deriving a filtered gear ratio by filtering the current gear ratio as a function of the current gear ratio and a previously derived filtered gear ratio to filter changes in the current gear ratio between computational cycles,
   wherein the calculated gear ratio used in the step of providing a usable gear ratio is the filtered gear ratio.

8. The method for computing a stabilized vehicle speed value of claim 7, wherein the step of deriving a filtered gear ratio includes performing a recursive calculation through a unity gain single pole digital filter implemented by an equation of the form $GR*G_m + GR_F*G_n$, where GR is a current gear ratio, $GR_F$ is a filtered gear ratio derived in a previous computational cycle, and $G_m$ and $G_n$ are gains the sum of which totals 1.0.

9. The method for computing a stabilized vehicle speed value of claim 8, wherein in the digital filter equation, the gain applied to the GR is less than the gain applied to $GR_F$ (i.e., $G_m$ is less than $G_n$).

10. The method for computing a stabilized vehicle speed value of claim 9, wherein the digital filter has a time constant approximately equal to seven seconds.

11. The method for computing a stabilized vehicle speed value of claim 7, wherein the step of computing a calculated gear ratio includes the step of determining whether the filtered gear ratio has stabilized by:
   computing a stability test value which is equal to the difference between the filtered gear ratio and the previously generated usable gear ratio; and
   comparing the stability test value to a predetermined second limit value, such second limit value being indicative of a tolerance band within which a gear ratio will be regarded as stabilized even if the measured vehicle speed value changes between cycles.

12. The method for computing a stabilized vehicle speed value of claim 11, wherein the step of determining whether the filtered gear ratio has stabilized includes:
   determining whether the stability test value has been less than the second limit value for a predetermined time period, wherein the filtered gear ratio is determined to be stabilized after the expiration of such time period.

13. A method for computing a stabilized vehicle speed value from a detected vehicle speed signal and a detected engine speed signal, the stabilized vehicle speed value being for use by a vehicle speed control system, the method comprising the continuous cyclic steps of:

generating a measured vehicle speed value from the detected vehicle speed signal;

generating a measured engine speed value from the detected engine speed signal;

computing a calculated gear ratio as a function of the measured vehicle speed value and the measured engine speed value;

generating a filtered gear ratio by filtering the calculated gear ratio as a function of the calculated gear ratio and a filtered gear ratio from a previous computational cycle to filter changes in the calculated gear ratio between computational cycles; and calculating a stabilized vehicle speed value from the measured engine speed and the filtered gear ratio provided in the previous step of generating a filtered gear ratio, and providing the stabilized vehicle speed value for use by the vehicle speed control system.

14. The method for computing a stabilized vehicle speed value of claim 13, wherein the step of generating a filtered gear ratio includes performing a recursive calculation through a unity gain single pole digital filter implemented by an equation of the form $GR*G_m + GR_F*G_n$, where GR is a calculated gear ratio, $GR_F$ is a filtered gear ratio from the previous computational cycle, and $G_m$ and $G_n$ are gains the sum of which totals 1.0.

15. The method for computing a stabilized vehicle speed value of claim 14, wherein in the digital filter equation, the gain applied to the GR is less than the gain applied to $GR_F$ (i.e., $G_m$ is less than $G_n$).

16. The method for computing a stabilized vehicle speed value of claim 15, wherein the digital filter has a time constant approximately equal to seven seconds.

17. The method for computing a stabilized vehicle speed value of claim 13, and further comprising:

generating a usable gear ratio which is changed from a previously generated usable gear ratio if changes in the filtered gear ratio from the previously generated filtered gear ratio exceed a predetermined limit value, and which is otherwise unchanged from the previously generated usable gear ratio, wherein the usable gear ratio is substituted for the filtered gear ratio in the step of calculating a vehicle speed value.

18. A device for computing a predicted vehicle road speed value for use by a vehicle speed control system of a vehicle having a drive train that includes a tailshaft and an engine that includes a crankshaft, the device comprising:

first sensor means for sensing the rotation rate of the tailshaft of the vehicle's drive train and generating a first signal proportional to the rotation rate;

second sensor means for sensing the rotation rate of the crankshaft of the vehicle's engine and generating a second signal proportional to the rotation rate;

means for communicating said first signal and said second signal to a computer;

said computer having means for periodically calculating an estimated tailshaft rpm value from said first signal, means for periodically calculating an average engine rpm value from said second signal, means for periodically calculating an estimated gear ratio value from said estimated tailshaft rpm value and said average engine rpm value, means for periodically storing past values of said estimated gear ratio value, means for periodically calculating a usable gear ratio value from said estimated gear ratio value and said past values of said estimated gear ratio value, and means for periodically calculating a predicted road speed value of the vehicle from said usable gear ratio value and said average engine rpm value;

means for communicating said predicted road speed value to the vehicle speed control system.

19. The device of claim 18 wherein said computer further includes means for storing at least one past value of said predicted road speed value and means for preventing said predicted road speed value from changing with respect to said past value of said predicted road speed value in excess of a predetermined limit.

20. The device of claim 18 wherein said computer further includes means for calculating a filtered gear ratio value from said estimated gear ratio value and at least one of said past values of said estimated gear ratio value, means for calculating a difference value between said estimated gear ratio value and said filtered gear ratio value, and means for setting said usable gear ratio value equal to said estimated gear ratio value if said difference value exceeds a predetermined limit.

21. A device for computing a stabilized vehicle speed value from a detected vehicle speed signal and a detected engine speed signal, the vehicle speed value being for use by a vehicle speed control system, the device comprising:

means for generating a measured vehicle speed value from the detected vehicle speed signal;

means for generating a measured engine speed value from the detected engine speed signal;

means for computing a calculated gear ratio as a function of the measured vehicle speed value and the measured engine speed value;

means for generating a filtered gear ratio by filtering the calculated gear ratio as a function of the calculated gear ratio and a filtered gear ratio from a previous computational cycle to filter changes in the calculated gear ratio between computational cycles; and means for calculating a vehicle speed value from the measured engine speed and the filtered gear ratio provided by said means for generating a filtered gear ratio, and providing the vehicle speed value for use by the vehicle speed control system.

22. The device of claim 21, wherein said means for generating a filtered gear ratio includes a unity gain single pole digital filter and means for performing a recursive calculation through said unity gain single pole digital filter implemented by an equation of the form $GR*G_m + GR_F*G_n$, where GR is a current gear ratio, $GR_F$ is a filtered gear ratio derived in the last preceding cycle, and $G_m$ and $G_n$ are gains the sum of which totals 1.0.

23. The device of claim 22, wherein in the digital filter equation, the gain applied to the GR is less than the gain applied to $GR_F$ (i.e., $G_m$ is less than $G_n$).

24. The device of claim 23, wherein the digital filter has a time constant approximately equal to seven seconds.

25. The device of claim 21 further comprising:
means for generating a usable gear ratio which is changed from a previously generated usable gear ratio if changes in the filtered gear ratio from the previously generated filtered gear ratio exceed a predetermined limit value, and which is otherwise unchanged from the previously generated usable gear ratio; and means for substituting the usable gear ratio for the filtered gear ratio.

* * * * *